US008696241B2

(12) United States Patent
Lee et al.

(10) Patent No.: US 8,696,241 B2
(45) Date of Patent: Apr. 15, 2014

(54) FLEXIBLE DRAINAGE CELL

(75) Inventors: Alan Sian Ghee Lee, Singapore (SG); David Oliver, Newington (AU); Henry Greaves, Watsons Bay (AU)

(73) Assignee: Alan Sian Ghee Lee, Singapore (SG)

( * ) Notice: Subject to any disclaimer, the term of this patent is extended or adjusted under 35 U.S.C. 154(b) by 389 days.

(21) Appl. No.: 12/992,068

(22) PCT Filed: May 13, 2009

(86) PCT No.: PCT/AU2009/000597
§ 371 (c)(1),
(2), (4) Date: Jan. 11, 2011

(87) PCT Pub. No.: WO2009/137876
PCT Pub. Date: Nov. 19, 2009

(65) Prior Publication Data
US 2011/0097151 A1    Apr. 28, 2011

(30) Foreign Application Priority Data
May 16, 2008  (AU) ............................. 2008902415

(51) Int. Cl.
*E02B 11/00* (2006.01)
(52) U.S. Cl.
USPC .................. 405/39; 405/36; 405/43; 405/45; 405/50; 404/36; 52/169.5
(58) Field of Classification Search
USPC ................. 405/29–36, 39, 43, 45, 47, 50, 52, 405/302.4; 404/36; 52/169.5
See application file for complete search history.

(56) References Cited

U.S. PATENT DOCUMENTS

| | | | |
|---|---|---|---|
| 5,250,340 A * | 10/1993 | Bohnhoff | 428/99 |
| 5,256,007 A * | 10/1993 | Allen | 405/302.4 |
| 6,095,718 A | 8/2000 | Bohnhoff | |
| 6,266,921 B1 | 7/2001 | Keskilohko | |
| 6,428,870 B1 * | 8/2002 | Bohnhoff | 428/44 |
| 6,736,569 B2 * | 5/2004 | Lee | 405/50 |
| 7,201,538 B2 | 4/2007 | Blackwood et al. | |
| 2003/0082359 A1 * | 5/2003 | Scott | 428/221 |
| 2006/0120804 A1 | 6/2006 | Blackwood et al. | |

FOREIGN PATENT DOCUMENTS

WO    WO 01/53608    7/2001

OTHER PUBLICATIONS

PCT International Search Report and the Written Opinion of the International Searching Authority, PCT/AU2009/000597, Australian Patent Office, Aug. 2009, 10 pages.

* cited by examiner

*Primary Examiner* — David Bagnell
*Assistant Examiner* — Carib Oquendo
(74) *Attorney, Agent, or Firm* — Snell & Wilmer L.L.P.

(57) ABSTRACT

A drainage cell comprises a backing plate defining a plurality of holes, a series of conical tubular structures having side walls and a base extending from the backing layer, the tubular structures being in fluid communication with at least some of the holes in the backing plate thereby allowing fluid to pass through the holes into a generally tubular structure. Sides of the tubular structures define apertures permitting fluid flow out of the tubular structures. Typically, the open area of the tubular structures is at least 20% of the area of the side walls of the tubular structures, and most preferably 70 to 75% of that area. Providing apertures in the side walls of the tubular structures significantly improves the rate of flow of the water through the cell and creates a higher internal drain void volume area.

15 Claims, 9 Drawing Sheets

FLEXIBLE DRAINAGE CELL

CROSS-REFERENCE TO RELATED APPLICATIONS

This application claims priority from Australian provisional patent application No 2008902415 entitled "Flexible drainage cell" filed 16 May 2008, the entire contents of which are hereby incorporated by reference.

FIELD OF THE INVENTION

This invention relates to an improved drainage cell.

BACKGROUND TO THE INVENTION

The control and flow of surface water, such as rain water or storm water, is important in preventing the build up of surface water adjacent to the foundations of buildings or other structures, and in other areas such as playing fields, golf courses, landscaped decks, gardens and the like. Roof gardens are becoming increasingly popular both to "green" buildings and make them more environmentally friendly, and also to provide recreational spaces. The use of drainage cells in roof gardens is critical in allowing excess water to escape quickly from the roof garden to drainage outlets. This reduces the potential for leakage of water through roofs, and also helps prevent load issues due to the weight of water, growth media and the like on top of a building's roof.

A typical drainage cell (often known as a dimpled drainage sheet) is formed from an extruded sheet of plastic in which is formed an array of protruding frusto-conical dimples. A layer of geo-textile is adhered to the base of the frusto-conical sections of the drainage cell. The cells are placed with the base of the frusto-conical sections and the geo-textiles facing upwards. The opposite face, or base, of the cell typically lies on a sheet of waterproof membrane or like when used in a roof garden application.

However, the problem with the existing drainage cells is that flow tends to be inhibited by the volume of the conical dimples occupying the space beneath the geo-textile layer. More significantly, the geo-textile tends to sag due to the weight of soil or other growth medium lying on top of the geo-textile layer. This tends to block or partially block the spaces between the conical dimples, thus impeding water flow and slowing the rate of water flow through the drainage cell. The problem of sagging geo-textile tends to increase as the drainage cell and geo-textile age.

The present invention aims to provide an improved drainage cell which addresses some of the problems of prior art drainage cells discussed above.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

In a first broad aspect, the present invention provides a drainage cell comprising a backing plate or sheet defining a plurality of holes, a series of tubular structures having side walls and a base extending from the backing layer, the tubular structures being in fluid communication with at least some of the holes in the backing layer thereby allowing fluid to pass through a hole into a tubular structure, wherein the side of the tubular structures define apertures thereby permitting fluid flow out of the tubular structures through the walls of the tubular portions.

Typically, the perforated or open area of the tubular structures is at least 20% of the area of the side walls of the cones, more preferably at least 40%, more preferably 50% or greater, and most preferably of the order of 70 to 75%.

Advantageously, providing apertures in the side walls of the tubular structures significantly improves not only the rate of flow of the water through the cell but also creates a higher internal drain void volume area as the water can occupy the interior of the tubular structures and not just the volume between cones. This contrasts with existing drainage cells in which the interior of the conical structures is not occupied by water.

Typically, the backing sheet is generally planar and is covered with a layer of a fluid permeable geo-textile which allows a restricted flow of fluid (usually water) through it.

Typically, half of the holes in the backing layer coincide with tubular structures with the other half of the holes being located in between the tubular structures. Thus only 50% of the apertures are typically located above tubular structures.

In use the drainage cell is used in the opposite orientation to existing drainage cells with the cell resting on and supported by the base of the tubular structures. The total area of the base of the tubular structures is typically less than 35%, most preferably less than 25% of the total area of the base of the cell. In one specific preferred embodiment the area is about 20%. The geo-textile layer is better supported by the planar backing layer and this reduces the tendency for the geo-textile to sag.

Because the geo-textile lies against the backing sheet and not on the ends of the tubular members, as in prior art drainage cells, it is possible for the drainage cells to be nested with the tubular structures from one drainage cell nesting in between the gaps between the tubular structures of another drainage cell. This significantly reduces the volume occupied by the drainage cells and makes transport of the drainage cells more cost effective.

The tubular structures are typically frustro-conical. However it will be appreciated that the structures need not be circular in cross-section but may be square or have any other suitable cross-sectional shape.

Typically the holes in the sheet have a diameter of about 15 to 25 mm, most preferably about 22.5 mm, to maximise the open area of the cell without compromising its strength. The diameter at the base of the conical structures is in the order of 18.5 mm for a 22.5 mm diameter hole.

The total area of the holes in the sheet is typically around 60 to 65% of the area of the sheet. This allows for rapid drainage.

The conical structures and apertures are preferably arranged in parallel arrays with one line of conical structures separated from the next line of conical structures by a line of simple, unsupported, holes. The centres of the holes and the conical structures is offset so that each hole is located in the centre of four conical structures and vice versa.

It is preferred that the interior of the tubular structures is reinforced. Typically this is achieved by means of an internal rib or ribs which extends down the internal side walls of the structure. Four such ribs may be provided for each conical structure and these may meet to define a cruciform structure at the base of the conical structure.

It is preferred that reinforcing ribs are also defined on the under side of the backing sheet extending between each pair of adjacent conical support structures.

BRIEF DESCRIPTION OF THE DRAWINGS

A specific embodiment of the present invention will now be described by way of example only with reference to the accompany drawings which.

DETAILED DESCRIPTION OF THE PREFERRED EMBODIMENT

Figure 1:
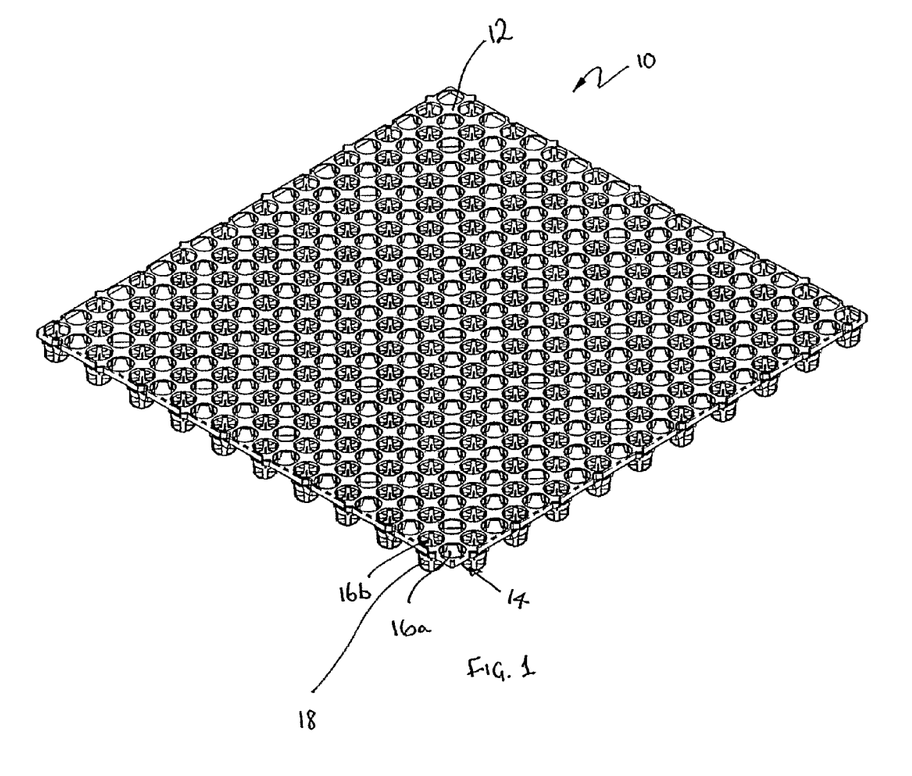
FIG. 1 is an isometric view from above of a drainage cell embodying the present invention.
Figure 2:
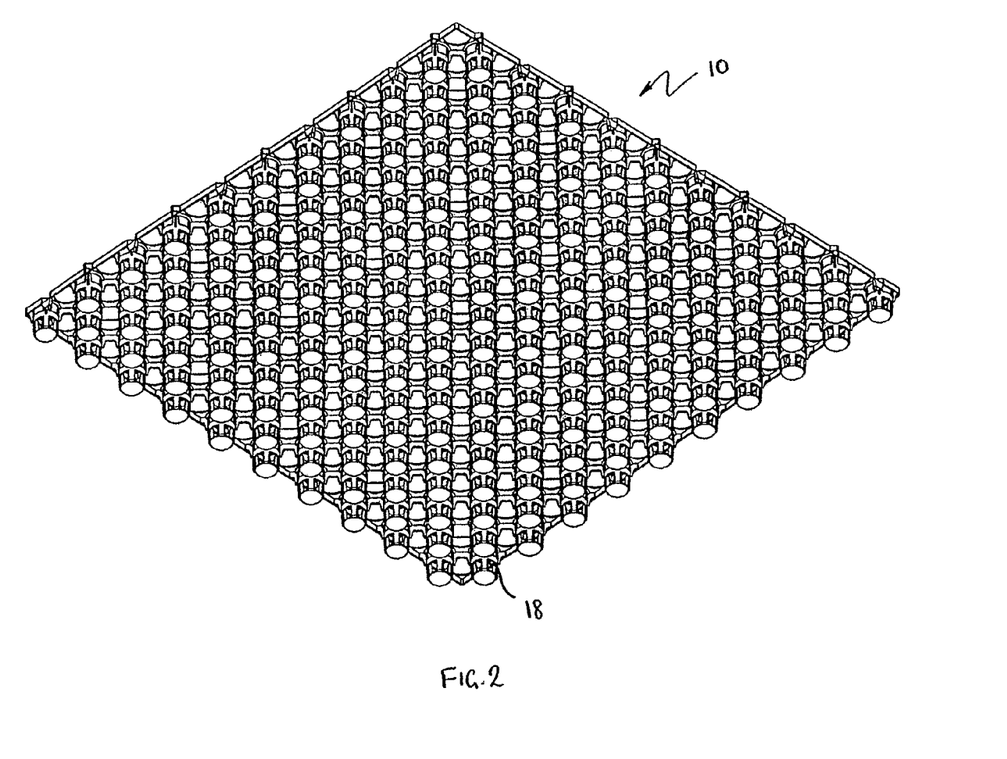
FIG. 2 is an isometric view of the drainage cell of FIG. 1 seen from below.

Referring to the drawings, FIGS. 1 and 2, show a drainage cell 10 embodying the present invention. The drainage cell is typically injection molded from a plastics material such as polypropylene, HDPE or LDPE. Recycled polypropylene may be used. However, any other suitable materials which can be molded or cast may be used. In the specific embodiment, the cell is about 30 mm high but it may range from 15 mm to 50 mm or more.

The drainage cell 10 comprises a generally square sheet of plastics material defining a perforated backing plate 12 which defines a plurality of parallel rows 14 of first and second circular holes 16a and 16b. A tubular support structure 18 which is generally frusto-conical, extends from each second hole 16b.

Figure 3:
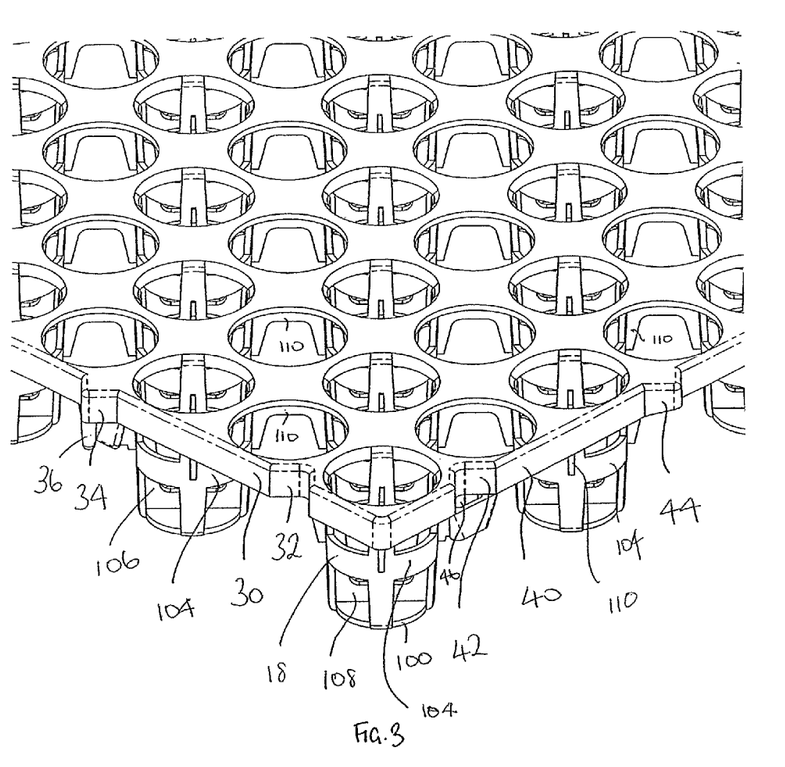
FIG. 3 is an enlarged isometric view of one corner of the drainage cell of FIG. 1.
Figure 5:
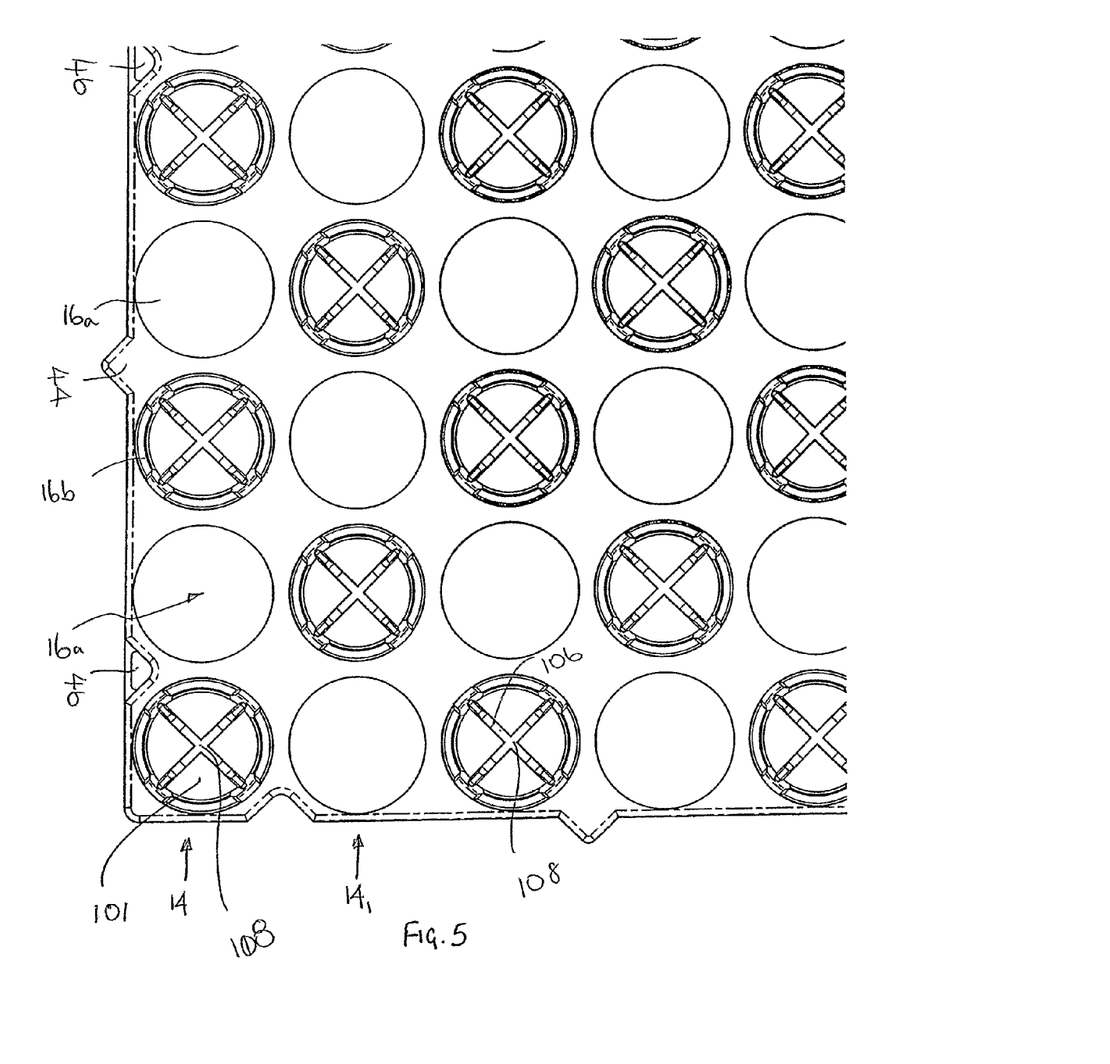
FIG. 5 is an enlarged top plan view of one corner of the drainage cell of FIG. 1.

More specifically, with reference to FIGS. 3 and 5, it can be seen that in each row 14, running parallel to the side of the cell, a support structure 18 depends from every second hole 16b in the row, with unsupported holes 16a being located between the holes 16b associated with supports. A similar arrangement is defined in the adjacent row 14 except that the supported and unsupported holes are offset by one. Thus as can be seen in the Figures, there is an unsupported hole 16a in the center of four supported holes 16b and a supported hole 16b is located at the center of four unsupported holes 16a. The unsupported holes 16a are the same size as the supported holes 16b, in the described embodiment but in a variant (not shown) may be larger.

Figure 8:
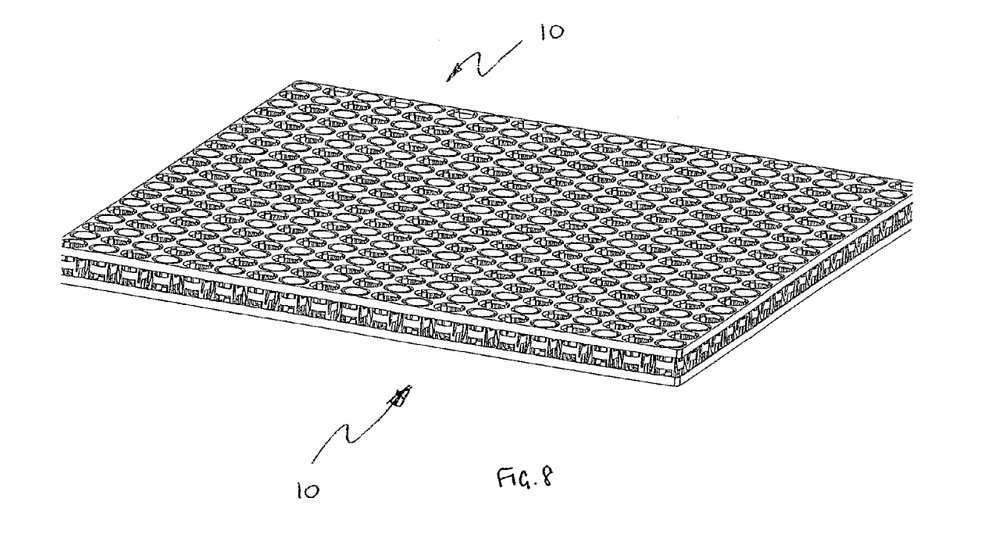
FIG. 8 is an isometric view showing two drainage cells embodying the present invention nested facing each other for transport or storage.

This arrangement allows two cells to be nested facing each other as shown in FIG. 8 to reduce the volume occupied by the cells for storage and/or transport by about 50%.

Alternatively, one can view the drainage cell as having alternating rows of supported and unsupported holes extending at 45° to the edges of the cell.

With reference to FIG. 3, one side edge 30 of the backing plate defines a series of alternating generally triangular cut out portions 32 and generally triangular projections 34. Depending from each triangular projection 34 is a male connecting member in the form of depending prong 36.

The adjacent side edge 40 of the cell also defines a series of triangular cut out portions 42 alternating with triangular protrusions 44. A slot 46 or female engaging means is defined below each of the triangular cut out portions 42. The slot is shaped and configured to receive the male connecting member so that the cells can be interconnected using the prongs and female slots. The prongs are ideally much longer than the slots as this helps keep the cells together when they are interlocked and prevents accidental disengagement.

However, for storage and transport, the cut-out portions 32 allow the cells also to be simply abutted without interconnecting them. In this case, the projecting triangular portions 34 locate in the cut out portions 32 of an adjacent cell. With reference to FIG. 3, it can be seen that two adjacent side edges have male connecting members and that those side walls have their cut out portions 32 and projections 34 offset to allow that.

Figure 4:
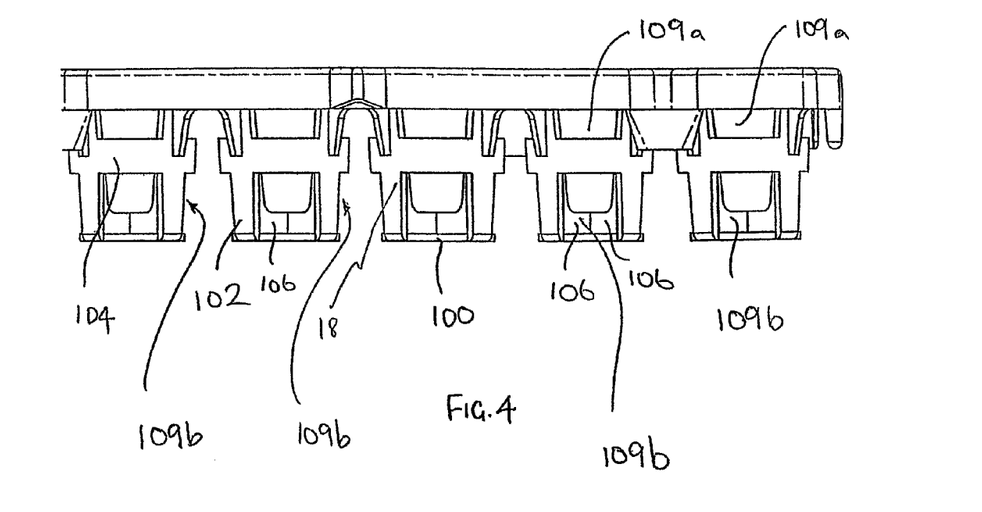
FIG. 4 is an enlarged side view of part of the drainage cell shown in FIG. 1.

FIGS. 3 and 4 also show the tubular support structures 18 in more detail. Each support structure is generally frusto-conical in shape tapering from the backing plate towards the base 100 of the support structure, The diameter of the hole 16b at the top of the cone is approximately 22.5 mm and the diameter of the base 101 of the cone is approximately 18.5 mm. The areas occupied by the base of the cones is small, typically about 20% of the total surface area of the base of the cell. This assists when stacking and nesting the cells.

The side walls of the cone are made up of four depending legs 102 spaced at 90° apart around the circumference of the base 100. Each leg is arcuate in horizontal cross-section so that envelope created by the rotation of the legs about a vertical axis passing through the centre of the base is frusto-conical. An annular ring 104 extends around the support 18 about midway between its base at its top connecting the four legs 102. Extending down the interior of each leg from the ring 104 to the base is a strengthening rib 106. The four ribs meet at the centre of the base in a cross 108—best seen in FIG. 5. With reference to FIG. 4 in particular, eight apertures 109a, 109b are defined in the sides of the support structure four (109b) between the legs 102, base 101 and ring 104 and four (109a) between the legs 102, top and ring 104. Typically, the open area of the tubular structures is of the order of 70 to 75% of the total surface area of the sides of the support structures/cones including the apertures. In other words the apertures constitute 70 to 75% of the unperforated area of the sides of the cone if the cone did not define apertures/perforations.

With reference to FIG. 3 a further strengthening rib 110 extends between each pair of diagonally opposite support structures 18. As can be seen the ribs extend down the exterior of the support structure as far as the ring 104 as well as extending under the top surface to the next support structure 18. Four ribs extend from each support structure 18.

It can be seen that the space between adjacent cones is relatively large—bigger than the diameter of the cones. The void area of the sheet (defined by the holes 16a and 16b is about 65% of the total area of the sheet (that is the solid part plus the holes). As the cones are open, water can flow through the interior of the cones and the total internal void are of the cell is about 95%. The cell allows water flow in there dimensions compared to existing dimple drainage sheets where the flow is essentially only 2-dimensional. Typically water flow rates may be around 20 liters/min which is two to three times the flow rate for typical dimpled drainage cells.

The cells have a compressive strength of about 70 tonnes/m². This is nearly twice the compressive strength of dimpled drainage sheets and allows for the cells to be used in other applications.

Figure 9:
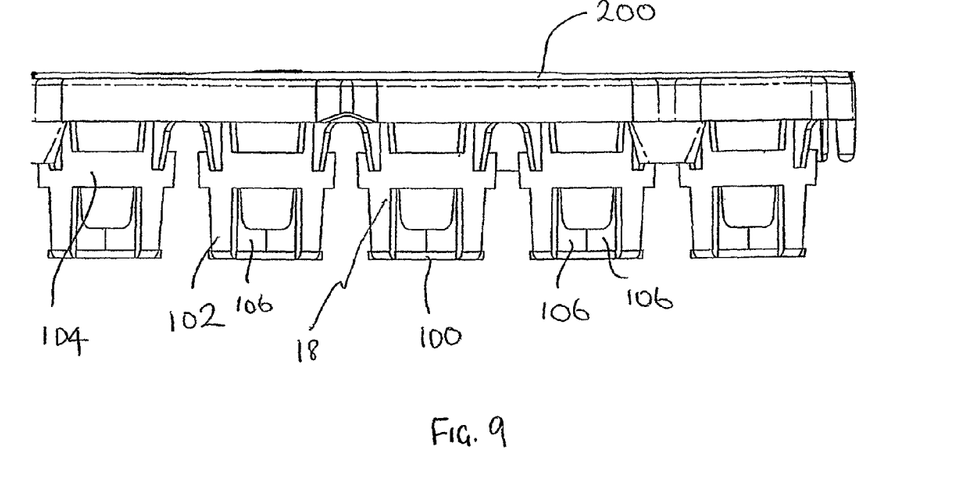
FIG. 9 shows a side view of a drainage cell covered with a layer of geotextile.

For most uses, use the backing sheet 10 is covered with a layer of geo-textile material 200—refer to FIG. 9. In that arrangement it is possible to nest the cells for transport as shown in FIG. 8. For this purpose the top layer must be rotated through 90° so that the base of the cones of the top layer oppose holes 16a in the lower layer. Clearly, to enable nesting the cells should be square.

Figure 6:
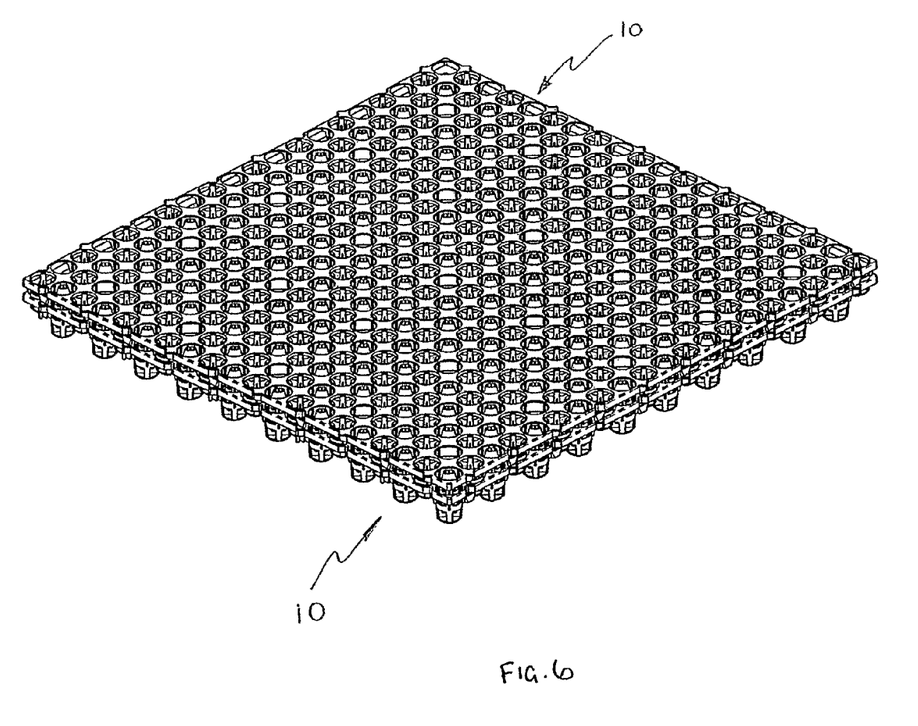
FIG. 6 is an isometric view showing two drainage cells stacked one within the other.
Figure 7:
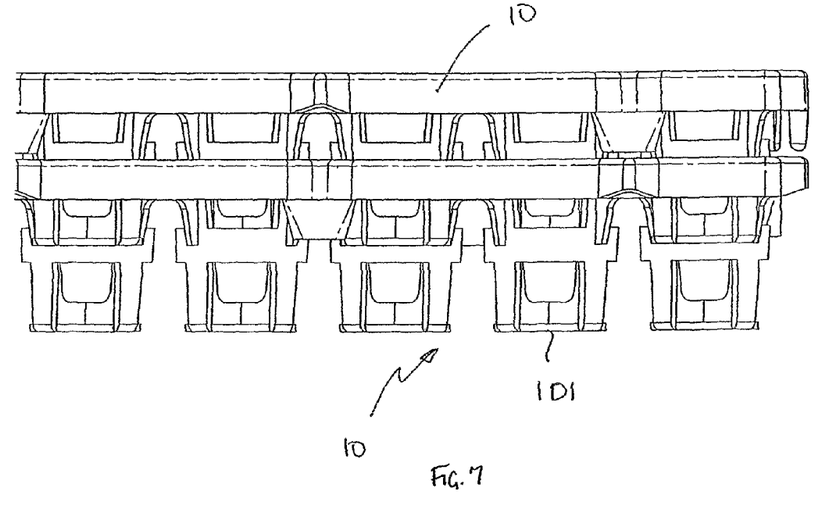
FIG. 7 is a side view of the stacked arrangement shown in FIG. 6.

FIGS. 6 and 7 shows the cells without geo-textile stacked and nested with each support structure 18 of an upper cell inserted about halfway into an unsupported hole 16a of a lower cell, as best seen in FIG. 7. In the stacked arrangement of FIG. 6, it is anticipated that a plurality of cells may be stacked and nested one on top of another and enclosed in a permeable geo-textile or impermeable envelope thereby creating a tank for temporary storage or more permanent storage and control of water such as storm water, drainage water or the like. The construction of the cells allows the tank to support a considerably greater weight, typically doubling the strength of the cells. The cells may be used in the nested configuration for other purposes other than enclosed in an envelope as a tank, for example where increased strength is required. The stacked cells also occupy less volume and when a plurality of cells are nested one within the other the cells occupy about 50% less volume than if they were not nested.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

The invention claimed is:

1. A drainage cell comprising a backing plate defining a plurality of holes, a series of tubular structures having side walls and a base extending from the backing plate, one half of the holes in the backing plate coinciding with the tubular structures, the other half of the holes being unsupported and located in between the tubular structures, the tubular structures defining an interior, wherein the interior of each of the tubular structures is reinforced by one or more internal ribs which extend down the internal side wall of the tubular structure, reinforcing ribs on the underside of the backing plate extending between each pair of adjacent tubular support structures, the tubular structures in fluid communication with at least some of the holes in the backing plate allowing fluid to pass through one of the plurality of holes in the backing plate into one of the tubular structures, the side walls of the tubular structures defining apertures, thereby permitting fluid flow out of the tubular structures through the apertures in the side walls of the tubular structures.

2. The drainage cell of claim 1 wherein the total area of the apertures in the tubular structures defines an open area which is at least 20% of the total area of the side walls of the tubular structures.

3. The drainage cell of claim 2 wherein the open area of the tubular structures is at least at least 40% of the total area of the side walls of the tubular structures.

4. The drainage cell of claim 3 wherein the open area of the tubular structures is at least at least 50% of the total area of the side walls of the tubular structures.

5. The drainage cell of claim 4 wherein the open area of the tubular structures is between 70 to 75% of the total area of the side walls of the tubular structures.

6. The drainage cell of claim 1 wherein, the backing plate is generally planar and is covered with a layer of a fluid permeable geotextile.

7. The drainage cell of claim 1 wherein the holes in the backing plate have a diameter of about 15 to 25 mm.

8. The drainage cell of claim 1 wherein the tubular structures are frusto-conical.

9. The drainage cell of claim 1 wherein the total area of the holes in the backing plate are around 60 to 65% of the total area of the plate.

10. The drainage cell of claim 1 wherein the tubular structures and unsupported holes are arranged in parallel arrays with one line of tubular structures separated from an adjacent line of tubular structures by a line of unsupported holes with centers of the unsupported holes and the tubular structures being offset so that apart from the edges of the backing plate, each unsupported hole is surrounded by four tubular structures and each tubular structure is surrounded by four unsupported holes.

11. The drainage cell of claim 1 wherein four ribs reinforce each tubular structure and meet to define a cruciform structure at the base of the tubular structure.

12. The drainage cell of claim 1 wherein the total area of the holes in the backing plate is from 60 to 65% of the area of the backing plate.

13. The drainage cell of claim 1 wherein the total area of the base of the tubular structures is typically less than 35%, more preferably less than 25% of the total area of the backing plate of the cell and most preferably about 20% of the total area of the backing plate of the cell.

14. An underground drainage structure comprising a plurality of stacked drainage cells as claimed in claim 1 wherein the drainage cells are oriented with the tubular structures lowermost and supporting their respective backing plates.

15. An underground drainage structure comprising a plurality of drainage cells as claimed in claim 1 in a stacked and nested formation wherein the tubular structures of one drainage cell in the stack are nested at least partly within the unsupported holes of the drainage cell directly below the one drainage cell.

\* \* \* \* \*